(12) United States Patent
Hsiao et al.

(10) Patent No.: US 7,538,976 B2
(45) Date of Patent: May 26, 2009

(54) TRAILING SHIELD DESIGN FOR REDUCING WIDE AREA TRACK ERASURE (WATER) IN A PERPENDICULAR RECORDING SYSTEM

(75) Inventors: Wen-Chien David Hsiao, San Jose, CA (US); Yimin Hsu, Sunnyvale, CA (US); Vladimir Nikitin, Campbell, CA (US)

(73) Assignee: Hitachi Global Storage Technologies B.V., Amsterdam (NL)

( * ) Notice: Subject to any disclaimer, the term of this patent is extended or adjusted under 35 U.S.C. 154(b) by 415 days.

(21) Appl. No.: 11/412,017

(22) Filed: Apr. 25, 2006

(65) Prior Publication Data

US 2007/0247751 A1  Oct. 25, 2007

(51) Int. Cl.
*G11B 5/127* (2006.01)
(52) U.S. Cl. .................................................. 360/125.02
(58) Field of Classification Search ............ 360/125.02, 360/125.3, 126, 122, 125.01; 29/603.13; 216/22
See application file for complete search history.

(56) References Cited

U.S. PATENT DOCUMENTS

| | | | |
|---|---|---|---|
| 4,317,148 A | 2/1982 | Chi | 360/119 |
| 4,656,546 A | 4/1987 | Mallory | 360/110 |
| 5,075,280 A | 12/1991 | Pisharody et al. | 505/1 |
| 6,469,876 B1 | 10/2002 | Sasaki et al. | 360/317 |
| 2004/0021981 A1 | 2/2004 | Morita et al. | 360/119 |
| 2005/0068671 A1 | 3/2005 | Hsu et al. | 360/125 |
| 2005/0068678 A1 * | 3/2005 | Hsu et al. | 360/126 |
| 2005/0083605 A1 | 4/2005 | Hu et al. | 360/125 |
| 2005/0141137 A1 * | 6/2005 | Okada et al. | 360/122 |

(Continued)

FOREIGN PATENT DOCUMENTS

EP  1522991  4/2005

OTHER PUBLICATIONS

European Search Report from application No. 07250690 mailed on Jun. 5, 2008.

*Primary Examiner*—Tianjie Chen
(74) *Attorney, Agent, or Firm*—Zilka-Kotab, PC

(57) ABSTRACT

A magnetic structure for use in a magnetic head for avoiding wide angle track erasure and other forms of adjacent track interference. The magnetic structure includes a trailing shield having a specially configured back edge opposite the air bearing surface ABS. The magnetic shield has a shallow substantially constant throat height at a center portion. Then, the back edge of the shield tapers back away from the ABS in first and second intermediate portion located at either side of the center portion. These intermediate portions lead to first and second outer portions that have substantially constant throat heights that are larger than the throat height at the center region. The throat height at each of the laterally outer portions can be 1.5 to 5 times the throat height of the center portion. This configuration, chokes off stray fields that might be picked up by the outer portions of the shield preventing excessive magnetic flux from reaching the central portion of the shield where it might affect writing. In addition, the limited throat height of the outer portion (ie. the back edge of the outer portions does not keep tapering back away from the ABS) prevents the outer portions from picking up too much stray magnetic field, while also ensuring that sufficient magnetic material will be present to absorb desired magnetic field from the write pole during use.

20 Claims, 9 Drawing Sheets

U.S. PATENT DOCUMENTS

| | | |
|---|---|---|
| 2005/0180048 A1 | 8/2005 | MacDonald et al. ... 360/125.06 |
| 2005/0190479 A1* | 9/2005 | Terris et al. ............ 360/59 |
| 2005/0219746 A1 | 10/2005 | Takano et al. ........... 360/126 |
| 2006/0000794 A1* | 1/2006 | Le ........................ 216/22 |
| 2007/0121248 A1* | 5/2007 | Sasaki et al. ........... 360/126 |
| 2007/0146931 A1* | 6/2007 | Baer et al. .............. 360/126 |
| 2007/0211377 A1* | 9/2007 | Sasaki et al. ........... 360/126 |
| 2007/0230045 A1* | 10/2007 | Hsiao et al. ............ 360/126 |
| 2007/0236831 A1* | 10/2007 | Che et al. .............. 360/126 |
| 2007/0245545 A1* | 10/2007 | Pentek et al. .......... 29/603.13 |
| 2007/0247749 A1* | 10/2007 | Bonhote et al. ........ 360/126 |
| 2007/0258167 A1* | 11/2007 | Allen et al. ............ 360/126 |
| 2008/0002291 A1* | 1/2008 | Balamane et al. ...... 360/125 |

* cited by examiner

TRAILING SHIELD DESIGN FOR REDUCING WIDE AREA TRACK ERASURE (WATER) IN A PERPENDICULAR RECORDING SYSTEM

FIELD OF THE INVENTION

The present invention relates to perpendicular magnetic recording and more particularly to a novel magnetic trailing shield design having reduced stray field sensitivity.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head traditionally includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

One of the features of perpendicular recording systems is that the high coercivity top layer of the magnetic medium has a high switching field. This means that a strong magnetic field is needed to switch the magnetic moment of the medium when writing a magnetic bit of data. In order to decrease the switching field and increase recording speed, attempts have been made to angle or "cant" the write field being emitted from the write pole. Canting the write field at an angle relative to the normal of the medium makes the magnetic moment of the medium easier to switch by reducing the switching field. Modeling has shown that a single pole writer in a perpendicular recording system can exhibit improved transition sharpness (ie. better field gradient and resolution), achieve better media signal to noise ratio, and permit higher coercive field media for higher areal density magnetic recording if, according to the Stoner-Wohlfarth model for a single particle, the effective flux field is angled. A method that has been investigated to cant the magnetic field has been to provide a trailing magnetic shield adjacent to the write head, to magnetically attract the field from the write pole.

The trailing shield can be a floating design, in that the magnetic trailing shield is not directly, magnetically connected with the other structures of the write head. Magnetic field from the write pole results in a flux in the shield that essentially travels through the magnetic medium back to the return pole of the write head. Alternatively, the shield can be a stitched design, wherein the shield is magnetically connected with the return pole. Various dimensions of the shield are critical for the trailing shield to operate correctly. For instance, effective angling or canting of the effective flux field is optimized when the write pole to trailing shield separation (gap) is about equal to the head to soft underlayer spacing (HUS) and the trailing shield throat height is roughly equal to half the track-width of the write pole. This design improves write field gradient at the expense of effective flux field. To minimize effective flux field lost to the trailing shield and still achieve the desired effect, the gap and shield thickness are adjusted to minimize saturation at the shield and effective flux field lost to the shield respectively. In order for a trailing shield to function optimally, the thickness of the trailing shield gap must be tightly controlled. Therefore, there is a need for a means for accurately controlling such trailing gap thickness during manufacture.

The use of perpendicular magnetic recording systems, however, presents challenges with regard to inadvertent, unwanted writing to the magnetic medium. The magnetic medium of a perpendicular recording system creates problems with regard to data erasure that are not generally encountered with longitudinal recording systems. The magnetic medium includes a thin magnetically hard top layer and a low coercivity underlayer. Because of its low coercivity and relatively large size, the soft underlayer is extremely susceptible to being affected by magnetic fields.

A trailing shield such as that described above can pick up stray magnetic fields from the flare region of the write pole coming from a direction behind the trailing shield (in the throat height direction) These magnetic fields, combined with the magnetic fields from the pole tip portion of the write pole can cause magnetic saturation in regions of the trailing shield outside of the track width of the write head. This saturation can cause magnetic fields to be emitted from the trailing shield in areas outside of the track width of the sensor. This can lead to what has been referred to as Wide Angle Track Erasure (WATER).

Therefore, there is a strong felt need for a trailing shield design that can provide effective desired field canting, while also avoiding undesired, inadvertent writing to the media such as Wide Angle Track Erasure (WATER). Such a design would preferably be easily implemented using existing manufacturing processes with little or no additional expense.

SUMMARY OF THE INVENTION

The present invention provides a magnetic trailing shield structure for use in a write head for perpendicular magnetic recording. The write head includes a structure having a front edge disposed toward the ABS and a back edge disposed away from the ABS, the distance between the front edge and back edge defining a throat height at any given location on the shield. The shield structure has a centrally located region or portion with a constant throat height (SH2), and has first and second outer regions located at first and second laterally outer ends, the first and second outer regions having a throat height (SH1) that is larger than SH2. First and second intermediate portions are each located between one of the outer portions and the central portion. The intermediate portions each have a tapered back edge that defines a variable throat height.

The back edge of each of the intermediate portions can define a throat height that varies linearly with lateral distance from the center of the structure. The back edge of each of the intermediate portions can form an angle of 10 to 20 or about 15 degrees with respect to the ABS, and can vary from a throat height of SH2 where it meets the central portion to SH1 where it meets the respective outer portion.

The throat height TH1 can be 1.5 to 5 times TH2 and the central portion can have a lateral width (parallel with the ABS) of 0.8-1.0 micrometers.

The configuration of a shield according to the present invention advantageously provides a desired amount of flux choking to prevent too much flux from the outer portions of the shield from reaching the center portion of the shield, where such flux might affect writing. The gentle, gradually increasing throat height of the intermediate region, however, advantageously prevents flux concentration from causing stray field writing or Wide Angle Track Erasure (WATER).

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
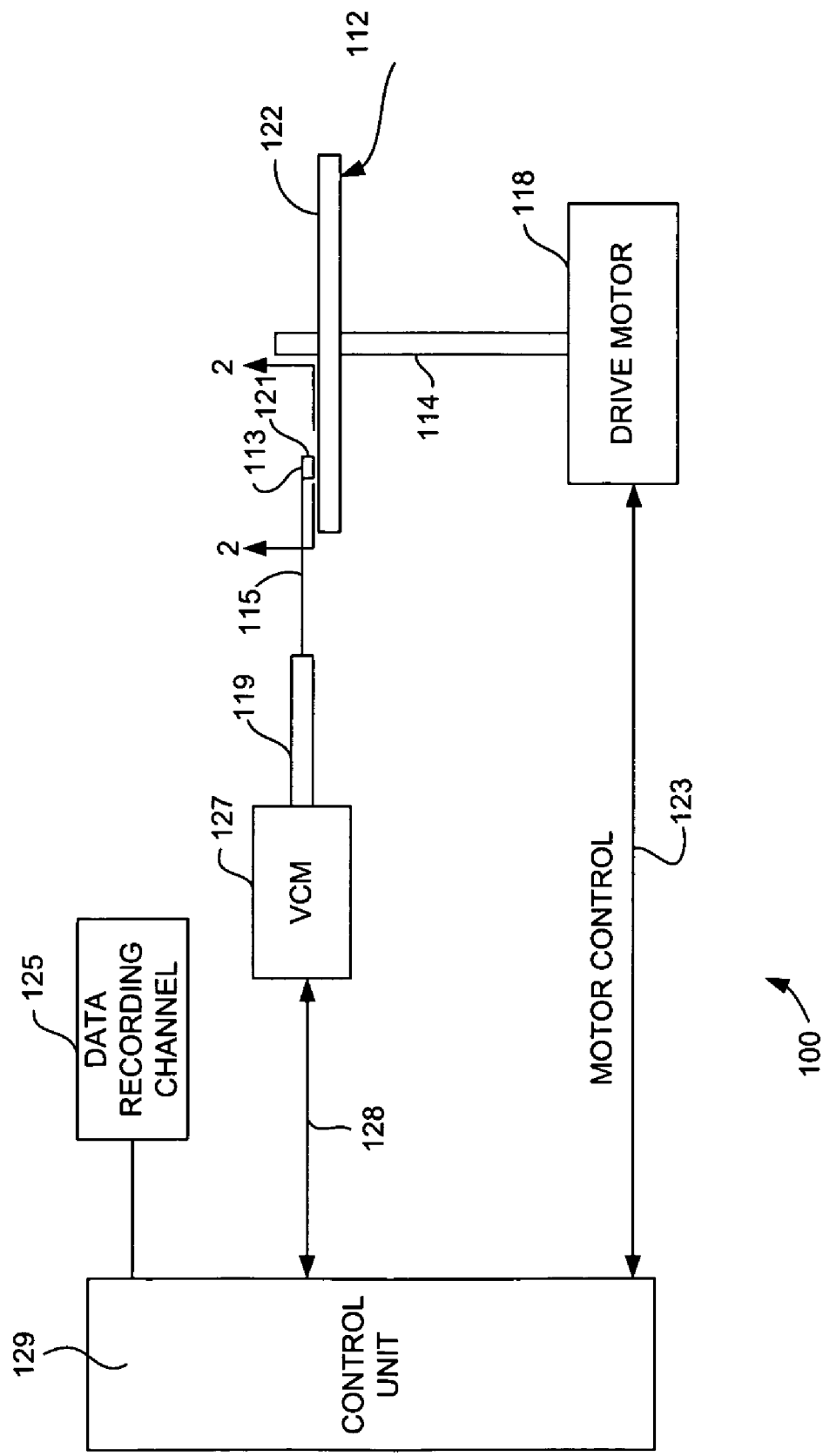
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 221. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
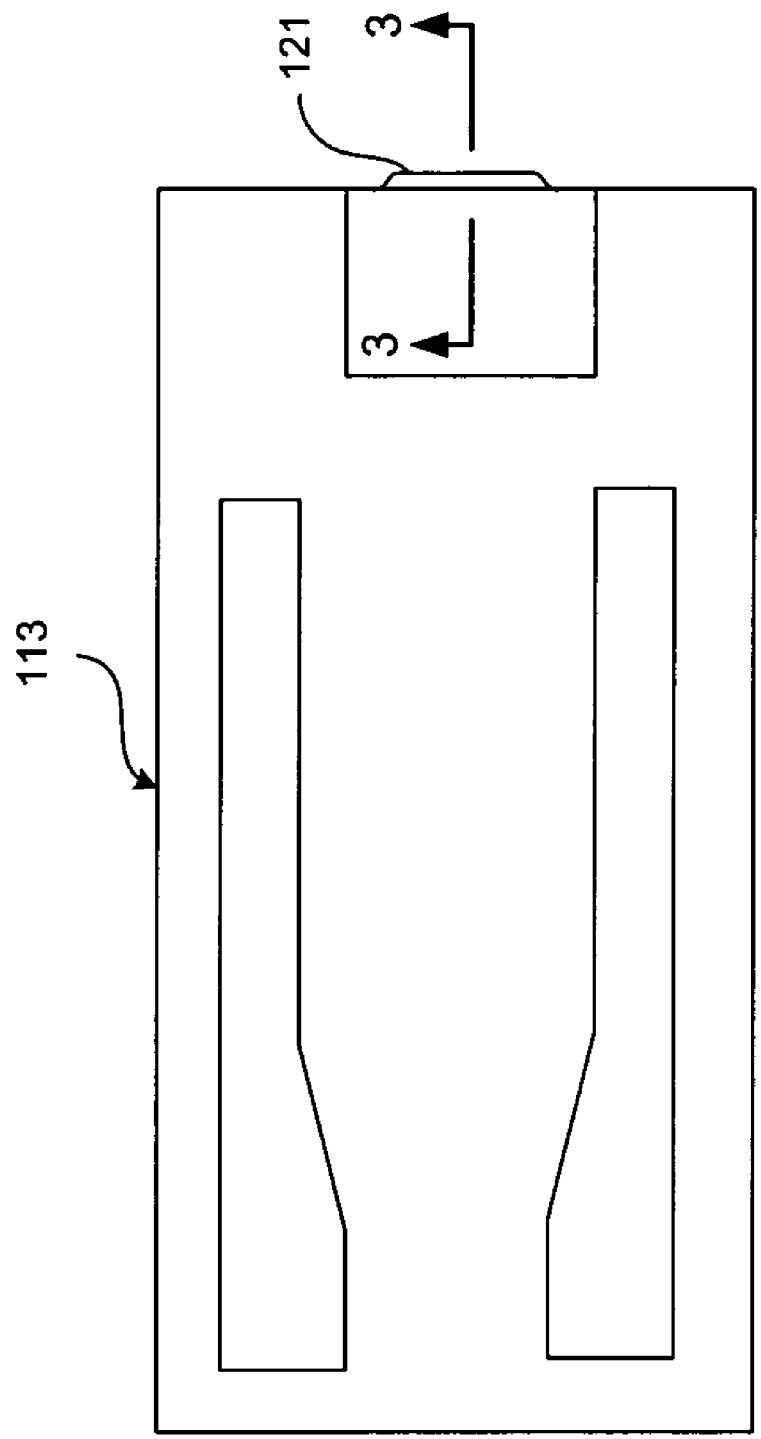
FIG. 2; is an ABS view of a slider, taken from line 2-2 of FIG. 3, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
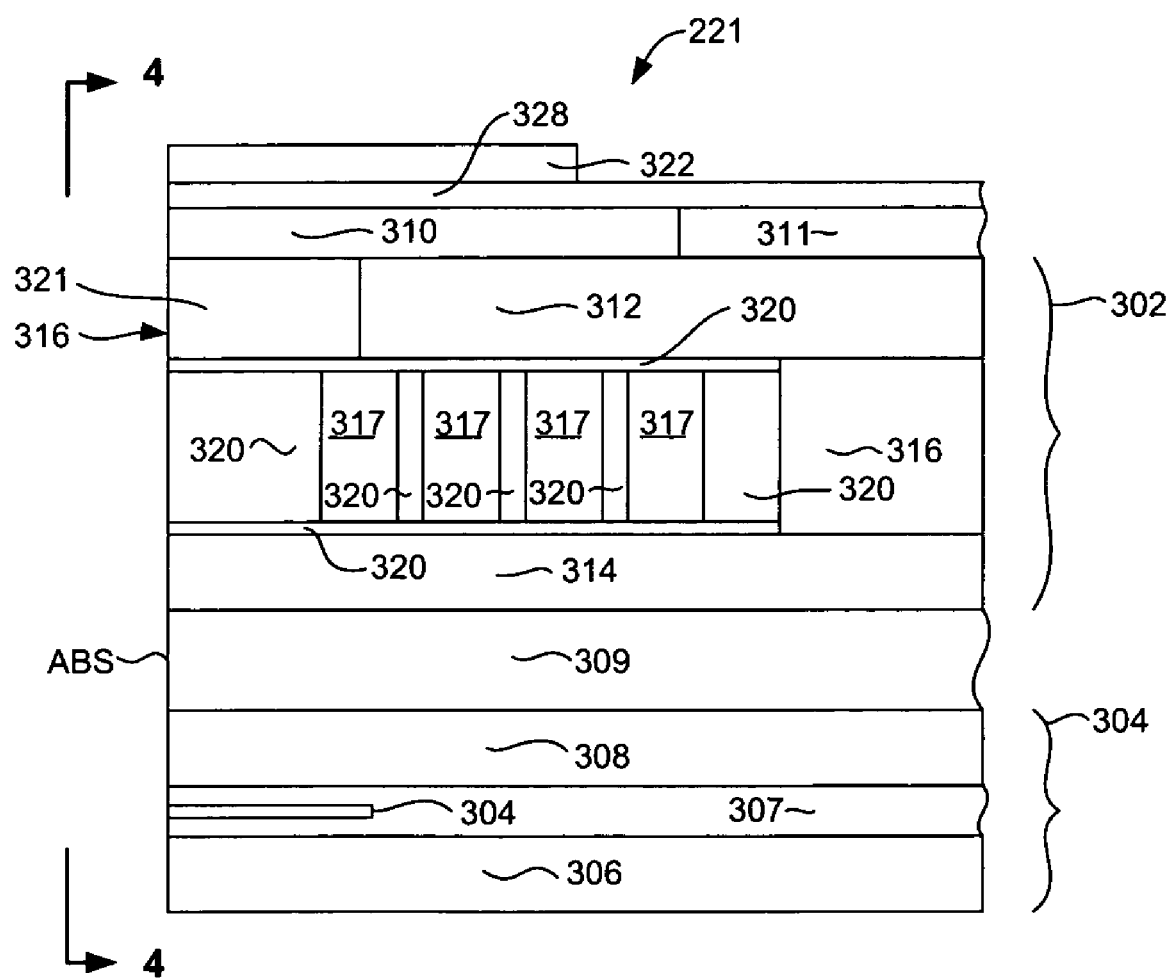
FIG. 3 is a cross sectional view of a magnetic head taken from line 3-3 of FIG. 2, enlarged, and rotated 90 degrees counterclockwise.

With reference now to FIG. 3, the magnetic head 221 for use in a perpendicular magnetic recording system is described. The head 221 includes a write element 302 and a read sensor 304. The read sensor is preferably a giant magnetoresistive (GMR) sensor and is preferably a current perpendicular to plane (CPP) GMR sensor. CPP GMR sensors are particularly well suited for use in perpendicular recording systems. However, the sensor 304 could be another type of sensor such as a current in plane (CIP) GMR sensor or, a tunnel junction sensor (TMR) or some other type of sensor. The sensor 304 is located between and insulated from first and second magnetic shields 306, 308 and embedded in a dielectric material 307. The magnetic shields, which can be constructed of for example CoFe or NiFe, absorb magnetic fields, such as those from up-track or down-track data signals, ensuring that the read sensor 304 only detects the desired data track located between the shields 306, 308. A non-magnetic, electrically insulating gap layer 309 may be provided between the shield 308 and the write head 302.

Figure 4:
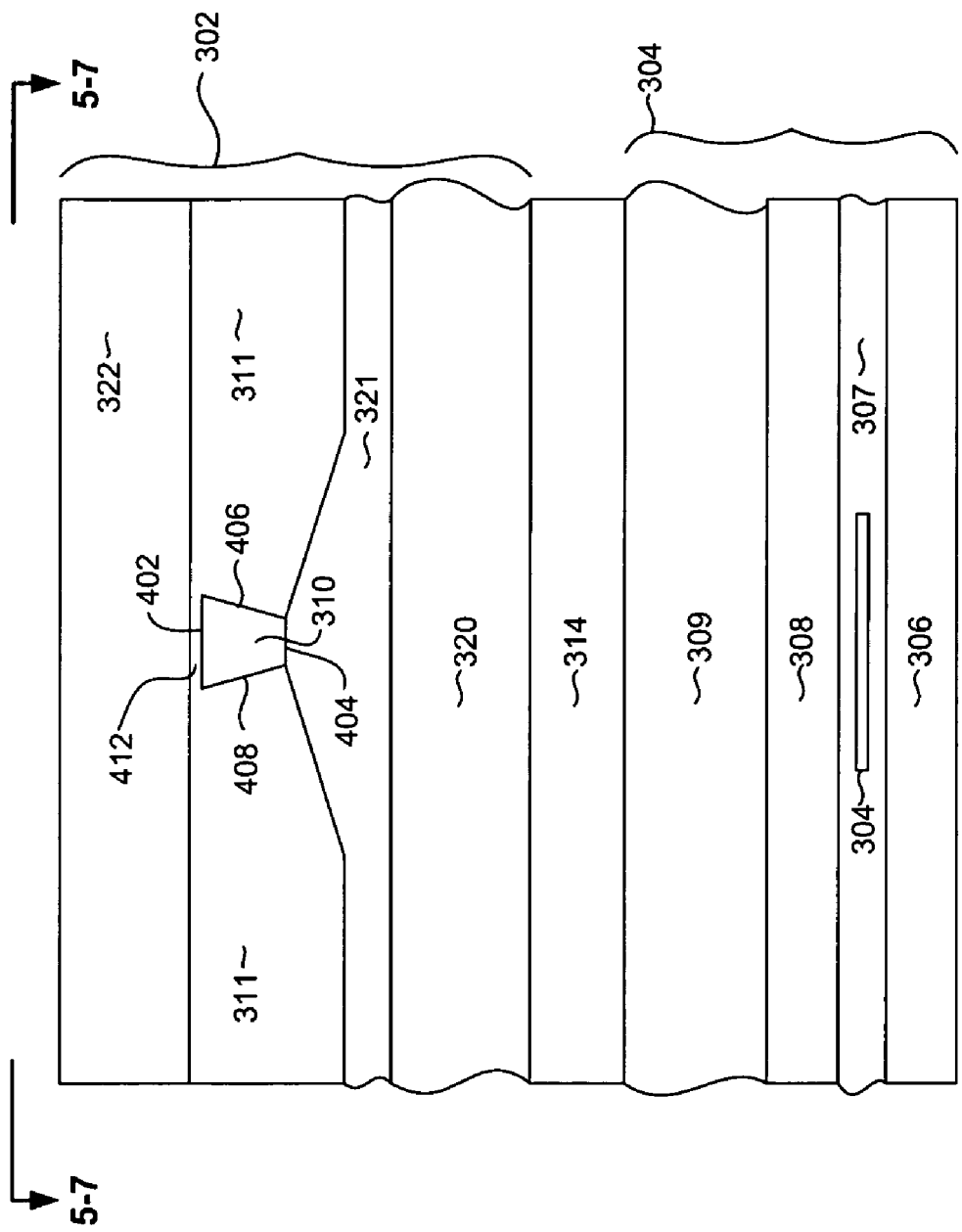
FIG. 4 is an ABS view, taken from line 4-4 of FIG. 3 and rotated 180 degrees, of a magnetic head according to an embodiment of the present invention.

With continued reference to FIG. 3, the write element 302 includes a write pole 310 that is magnetically connected with a magnetic shaping layer 312, and is embedded within an insulation material 311. As shown in FIG. 4, the write pole has a small cross section at the air bearing surface and is constructed of a material having a high saturation moment, such as NiFe or CoFe. The return pole layer 314 is constructed of a magnetic material such as CoFe or NiFe and has a cross section parallel to the ABS surface that is significantly larger than that of the write pole 310 as shown in FIG. 4. The return pole 314 is magnetically connected with the shaping layer 312 by a back gap portion 316 as shown in FIG. 3. The return pole 314 and back gap 316 can be constructed of, for example, NiFe, CoFe or some other magnetic material.

An electrically conductive write coil 317, shown in cross section in FIG. 3, passes through the write element 302 between the shaping layer 312, and the return pole 314. The write coil 317 is surrounded by an electrically insulating material 320 that electrically insulates the turns of the coil 317 from one another and electrically isolates the coil 317 from the surrounding magnetic structures 310, 312, 316, 314. When a current passes through the coil 317, the resulting magnetic field causes a magnetic flux to flow through the return pole 314, back gap 316, shaping layer 312 and write pole 310. This magnetic flux causes a write field 321 to be emitted toward an adjacent magnetic medium. The shaping layer 312 is also surrounded by an insulation layer 321 which separates the shaping layer 312 from the ABS. The insulation layers 320, 321, 311 can all be constructed of the same material, such as alumina ($Al_2O_3$) or of different electrically insulating materials.

The write head element 302 also includes a trailing shield 322. The write pole 310 has a trailing edge 402 and a leading edge 404. The terms trailing and leading are with respect to the direction of travel along a data track when the write head 302 is in use. The write pole 310 also preferably has first and second laterally opposing sides 406, 408 that are configured to define a width at the leading edge 404 that is narrower than the width at the trailing edge 404, forming a write pole 310 having a trapezoidal shape. This trapezoidal shape is useful in preventing adjacent track writing due to skew of the write head 302 when the head 302 is located at extreme outer or inner positions over the disk. However, this trapezoidal shape of the write head 310 is not necessary to practice the present invention.

With continued reference to FIG. 4, the magnetic trailing shield 322 is separated from the write pole 310, by a trailing gap 412, which is filled with a non-magnetic material such as Rh or alumina. The trailing shield gap is constructed of a thickness to provide a desired amount of write field canting, while not causing too much field to leak to the shield 322 which would result in a loss of write field performance. The trailing shield 322 can be constructed of a magnetic material such as NiFe.

Figure 5:
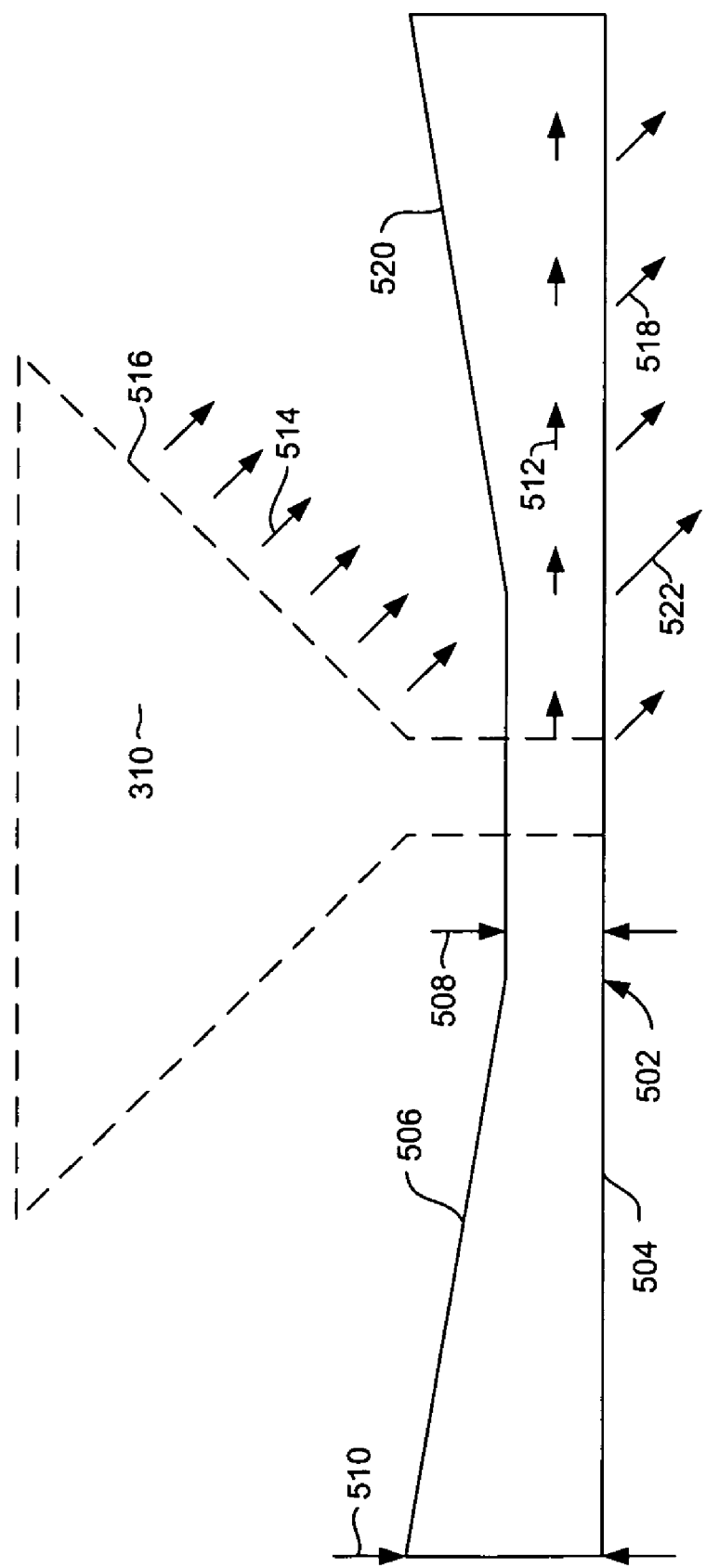
FIGS. 5-7 are top down views of a trailing magnetic shield illustrating a challenge presented by the use of such trailing magnetic shields.

With reference now to FIG. 5, a top-down view of a trailing shield illustrates a challenge presented by the use of a trailing shield 502 in a perpendicular magnetic recording system. A trailing shield is shown having an ABS edge 504 and a back edge 506 measured in a throat height direction. The trailing shield 502 has a narrower throat height 508 at its center and flares to a wider throat height 510 at the outer ends. The write pole 310 is shown in a dashed line in FIG. 5 and is located beneath the trailing shield 502 in the view shown in FIG. 5. Magnetic flux 512 from the pole tip of the write pole 310 travels from the center, where the write pole is located, to the outer ends, where this flux can be absorbed by the shield. Other stray magnetic fields 514, however, can be emitted from the flare region 516 of the write pole and even from the underlying shaping layer 312 or coil 317 (not shown in FIG. 5).

These stray fields can combine with the magnetic flux 312 to cause magnetic saturation which, in turn, causes a magnetic field 518 to be emitted from the ABS edge 504 of the shield 502. To make matters worse, a flux concentration point, such as the point where the narrow constant flare region 508 meets a flared region 520 can cause a spike 522 in this emitted field. This spike 522 is, of course, undesirable as it may cause Wide Area Track Erasure (WATER) as discussed earlier.

Figure 6:
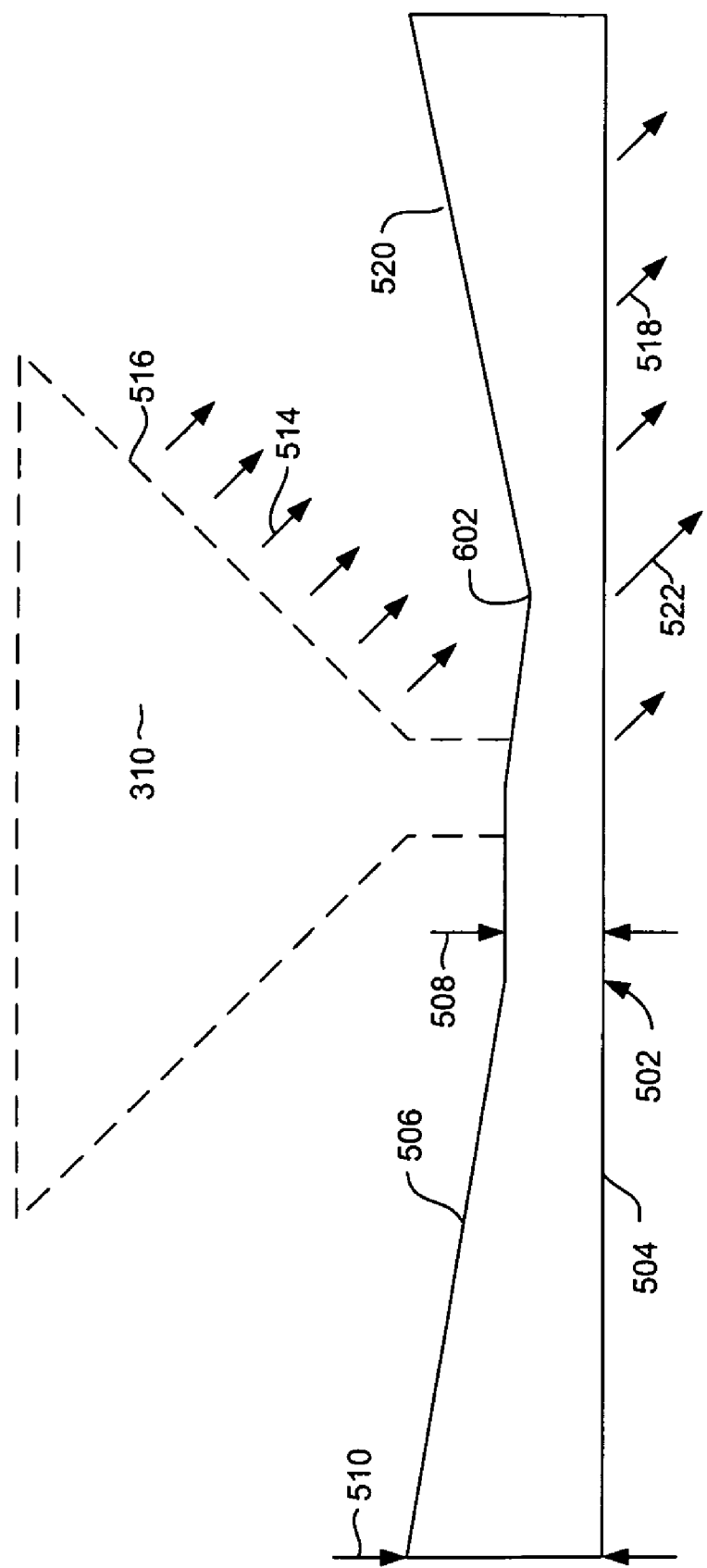
Figure 7:
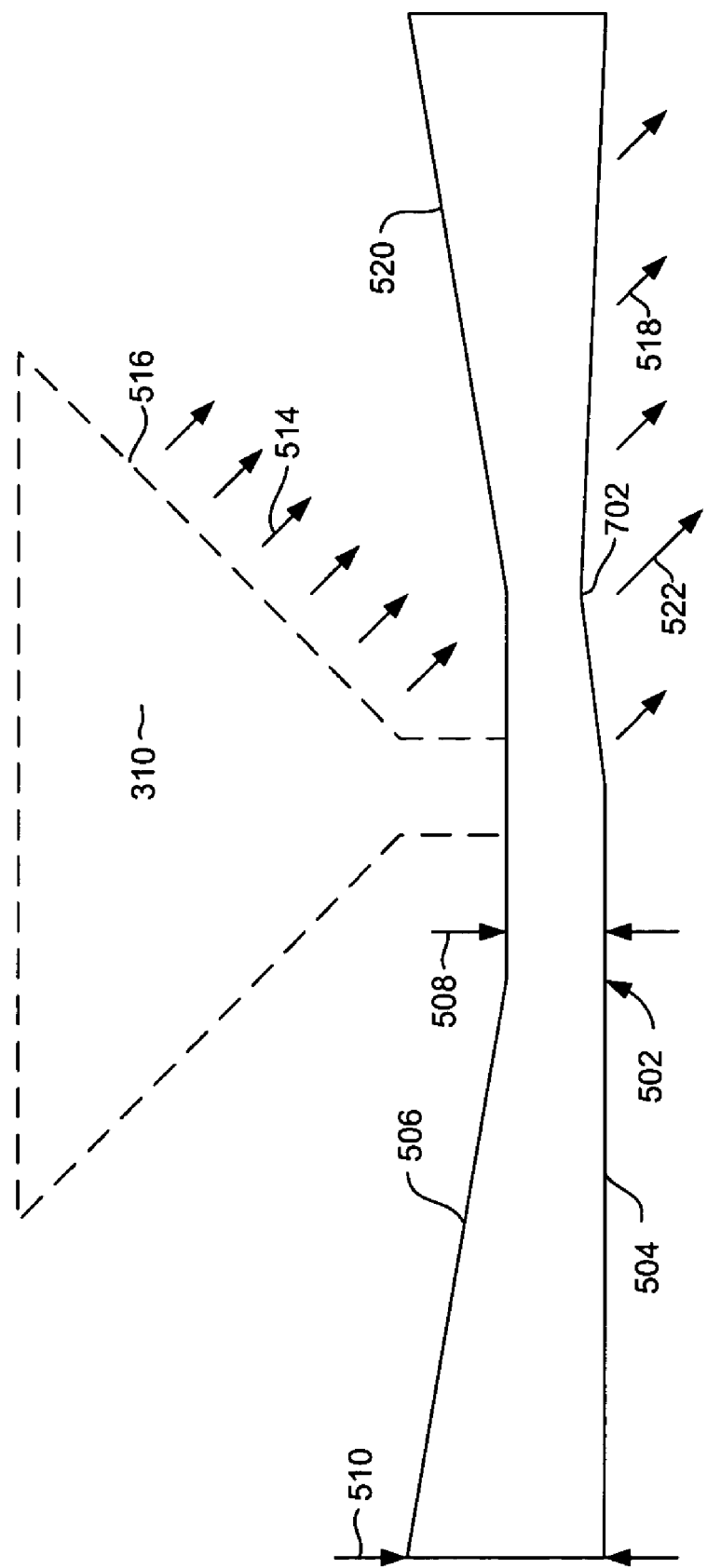

With reference to FIG. 6, further exacerbating the field spike WATER problem is that fact that the patterning of the trailing shield 502 can not be performed perfectly. As a result of certain variations in the patterning and plating processes a narrowing or pinching of the throat height can occur as indicated at location 602. In addition, with reference to FIG. 7, variations in the lapping process used to form the ABS 504 can cause variations in the depth of lapping, again resulting in narrowing or pinching, such as at location 702. This too, results in an increase in the field spike 522.

Figure 8:
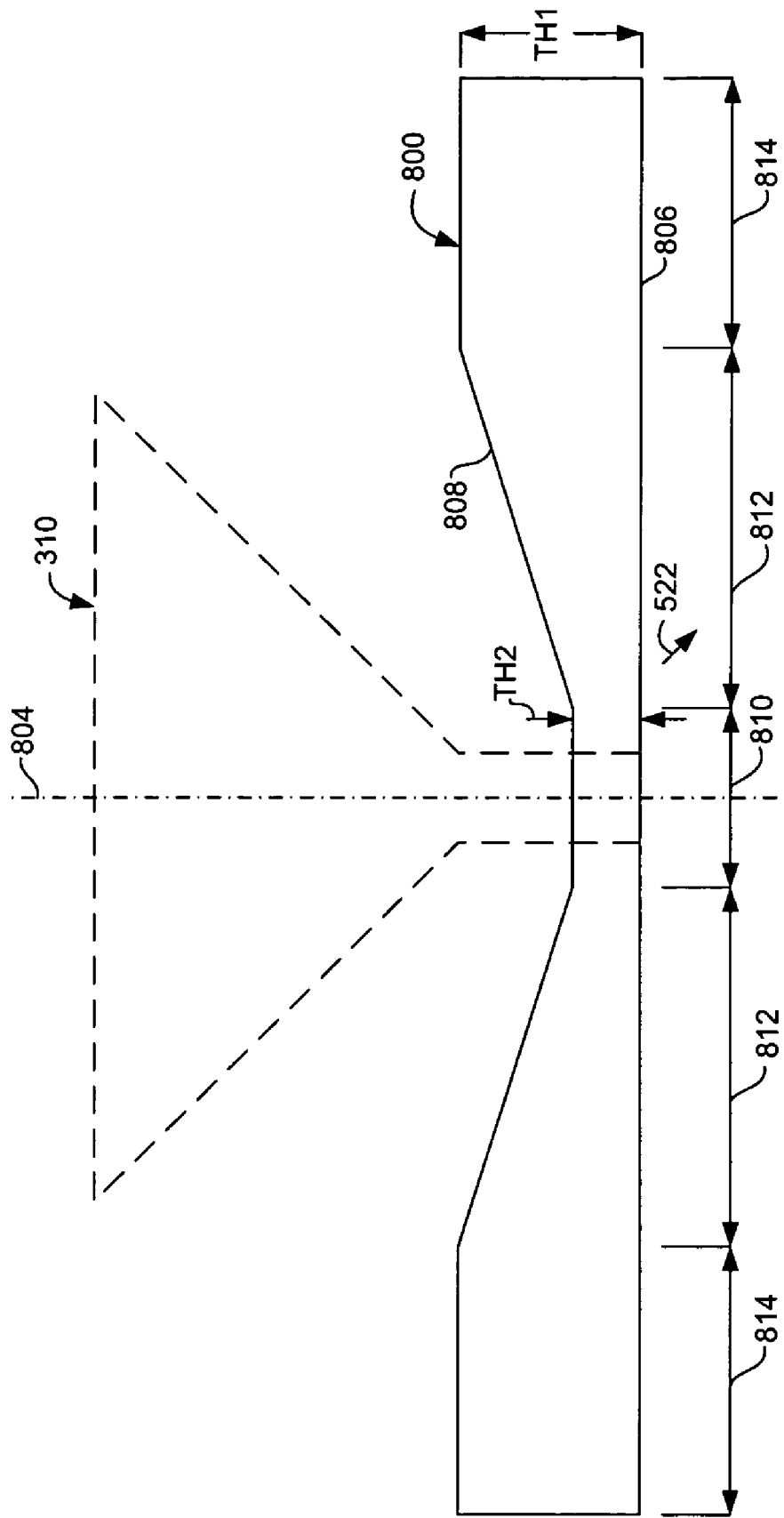
FIG. 8 is a top down view of a trailing shield illustrating an embodiment of the present invention.

With reference now to FIG. 8, a trailing shield 802 according to an embodiment of the present invention is shown constructed over a write pole 310, which is beneath the shield 802, into the plane of the page in FIG. 8. The shield 802 is constructed of a magnetic material, such as, but not limited to NiFe. The shield 802 is preferably generally symmetrical about a centerline 804, although certain variations and asymmetry are possible. The shield 800 has an ABS edge 802 and a back edge 808 opposite the ABS edge 806. The shield has a center, shallow, constant throat height section 810, a flared tapered intermediate region 812, and a deep constant throat height outer section 814. As those skilled in the art will recognize, the term "throat height" refers to the distance from the ABS 806 to the back edge 808 of the shield 800.

For purposes of simplicity, the term "lateral" will be defined herein to refer to a distance from the centerline 804 (ie. to the right and left as shown in FIG. 8). Similarly, the term forward will refer to a direction toward or beyond the ABS (ie. toward the bottom of the page in FIG. 8). The term "back" will refer to the direction away from the ABS (ie. the throat height direction or toward the top of the page as shown in FIG. 8).

The deep constant throat height sections 814 are formed at laterally outward positions of the trailing shield 802, and each of the tapered sections 812 are located at laterally intermediate positions between the outer, constant throat height section 814 and the center, shallow, constant throat height section 810.

The deeper constant throat height section 814 preferably has a throat height TH1 that is 1.5 to 5 times the throat height TH2 of the shallow, constant throat height center section 810. The shallow, constant throat height section preferably extends a distance of 0.4-0.5 um from the centerline. The back edge 808 of the tapered portions 812 preferably forms an angle of 10 to 20 degrees or about 15 degrees with respect to the ABS 806.

The choking provided by the tapered portion prevents excessive flux from entering the TS center portion, such as from stray fields that might be picked up by the larger outer portions 814. The gradual tapering of the throat height also avoids saturation as well as preventing excessive charge. The outer constant throat height portions 814 provide sufficient shield area to absorb desired flux from the center portion 810, while having a sufficiently limited area so as to prevent the outer portions from excessively picking up stray magnetic fields.

Figure 9:
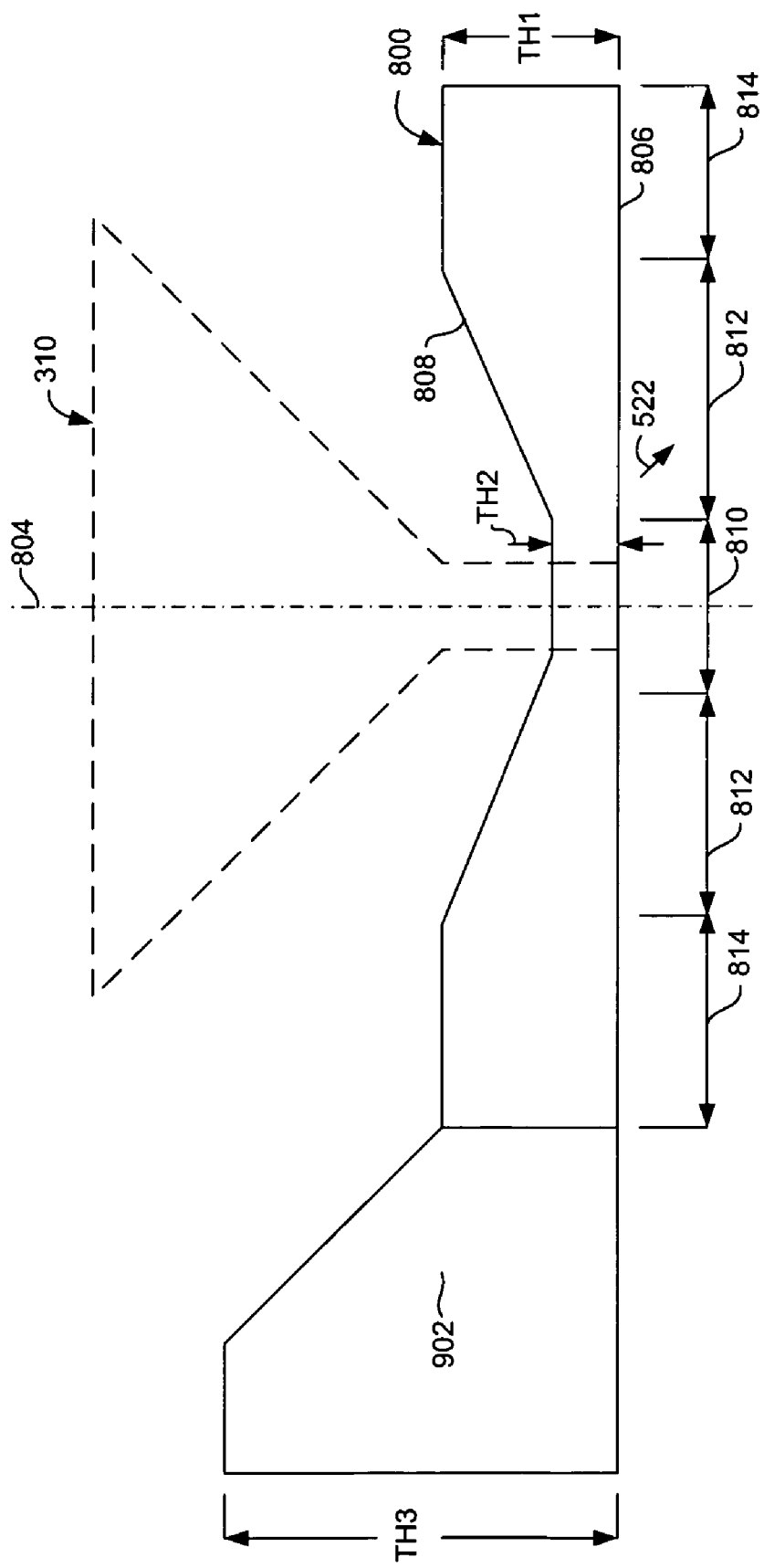
FIG. 9 is a top down vie of a trailing shield illustrating another embodiment of the invention.

With reference now to FIG. 9, in a possible embodiment of the invention, a shield 900 can be configured with an anchor pad 902. The anchor pad 902 can extend from an end of the shield 900. There, may be an anchor pad on one end or on both ends of the shield 900. The anchor pad 902 can extend a distance 904 of, for example, 5 um from the end of the outer constant throat height section 814. The anchor pad portion 902 may extend significantly further in the throat height direction than the rest of the shield 900, having a throat height Th3 that is larger than TH1 or TH2. The anchor pad provides the shield with mechanical stiffness and prevents the shield 902 from moving from its desired position.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic shield for use in a perpendicular magnetic write head, the magnetic shield comprising:
    a substantially straight air bearing surface (ABS);
    a center region;
    an outer region, and
    an intermediate region disposed between the center region and the outer region, wherein;
    the outer region has a back edge that defines a substantially constant throat height (TH1) as measured from the ABS, the center section has a back edge that defines a substantially constant throat height (TH2) that is smaller than TH1, and the intermediate region has a back edge that defines a varying throat height that tapers from a smaller throat height toward the center region to a larger throat height toward the outer region;
    wherein the intermediate region has a back edge that defines an angle of 10 to 20 degrees with respect to the ABS.

2. A magnetic shield as in claim 1 wherein the intermediate region has an inner end that meets an outer end of the center region and has an outer end that meets an inner end of the outer region, and wherein the inner end of the intermediate region has a throat height equal to TH2 and the outer end of the intermediate section has a throat height equal to TH1.

3. A magnetic shield as in claim 2 wherein the intermediate region has a back edge that varies linearly with from the inner end of the intermediate region to the outer end of the intermediate region.

4. A magnetic shield as in claim 1 wherein TH1 is 1.5-5 times TH2.

5. A magnetic shield as in claim 1 wherein the shield is substantially symmetrical about a centerline and wherein the center region extends a distance of 0.4 to 0.5 um from the centerline.

6. A magnetic shield as in claim 1 wherein the shield has a centerline and wherein the center region extends a distance of 0.4 to 0.5 um from the centerline.

7. A magnetic write head as in claim 1, further comprising an anchor pad extending laterally from an outer end of the outer region, the anchor pad having a throat height TH3 that is larger than TH1.

8. A magnetic trailing shield for use in a perpendicular magnetic recording head, the shield comprising:

a front edge disposed at an air bearing surface (ABS);

a center region having a back edge that defines a center region throat height (TH2) measured from the ABS;

first and second intermediate regions extending laterally from opposite ends of the central region, each of the intermediate regions having a back edge that defines a throat height that increases with increasing distance from the center region; and first and second outer regions, each extending laterally outward from a one of the first and second intermediate regions, each of the outer regions having a back edge that defines a throat height (TH1) as measured from the ABS that is substantially constant, TH1 being greater than TH2;

wherein each of the intermediate regions has a back edge that defines an angle of 10 to 20 degrees with respect to the ABS.

9. A magnetic trailing shield as in claim 8 wherein TH1 is 1.5 to 5 times TH2.

10. A magnetic trailing shield as in claim 8 wherein the central region has a lateral width of 0.8 to 1.0 um.

11. A magnetic trailing shield as in claim 8 wherein each of the intermediate regions has a back edge that defines a throat height that varies linearly from TH2 to TH1.

12. A magnetic trailing shield as in claim 8 wherein each of the intermediate regions has a throat height that varies from TH1 where the intermediate region meets the respective outer region to TH2 where the intermediate region meets the central region.

13. A magnetic trailing shield as in claim 8 wherein each of the intermediate regions has a throat height that varies linearly from TH1 where the intermediate region meets the respective outer region to TH2 where the intermediate region meets the central region.

14. A magnetic shield as in claim 8 further comprising an anchor pad extending from an end of at least one of the outer regions, the anchor pad having a throat height TH3 that is larger than TH1.

15. A magnetic shield as in claim 8 further comprising an anchor pad extending from an end of each of the outer regions, the anchor pad having a throat height TH3 that is larger than TH1.

16. A magnetic write head for use in a perpendicular magnetic recording system, the write head comprising:

a magnetic write pole having a trailing edge;

a magnetic return pole, magnetically connected with the write pole;

an electrically conductive write coil a portion of which passes between the return pole and the write pole;

a magnetic trailing shield formed adjacent to the trailing edge of the write pole and separated from the trailing edge of the write pole by a non-magnetic trailing shield gap layer, the magnetic trailing shield having a front edge disposed toward an air bearing surface (ABS) of the write head, and a back edge opposite the ABS, the shield having a central portion with a throat height (TH2) first and second intermediate portions each with a variable throat height, and first and second outer portions having a substantially constant throat (TH1), the first and second throat heights being measured from the ABS to the back edge of the shield, TH1 being larger than TH2, each intermediate portion being disposed between an outer portion and the center portion;

wherein each intermediate portion has a back edge that forms an angle of 10-20 degrees with respect to the ABS.

17. A magnetic write head as in claim 16 wherein each intermediate portion has a throat height that varies linearly from (TH2) to (TH1).

18. A magnetic write head as in claim 16 wherein TH1 is 1.5-5 times TH2.

19. A magnetic write head as in claim 16 wherein the center portion has a lateral width of 0.8-1.0 um.

20. A magnetic write head as in claim 16 wherein TH1 is 1.5 to 5 times TH2.

* * * * *